(12) United States Patent
Ashman (10) Patent No.: US 8,449,045 B2
(45) Date of Patent: May 28, 2013

(54) SOLID FORMING QUICK RELEASE BICYCLE AXEL

(76) Inventor: J. Leonard Ashman, Folsom, CA (US)

(*) Notice: Subject to any disclaimer, the term of this patent is extended or adjusted under 35 U.S.C. 154(b) by 157 days.

(21) Appl. No.: 12/927,624

(22) Filed: Nov. 18, 2010

(65) Prior Publication Data

US 2011/0133543 A1    Jun. 9, 2011

Related U.S. Application Data

(60) Provisional application No. 61/281,580, filed on Nov. 18, 2009.

(51) Int. Cl.
*B60B 35/00* (2006.01)

(52) U.S. Cl.
USPC ........................................ 301/124.2

(58) Field of Classification Search
USPC ............... 301/124.2, 279, 280; 280/279
See application file for complete search history.

(56) References Cited

U.S. PATENT DOCUMENTS

| | | | | |
|---|---|---|---|---|
| 5,165,762 | A * | 11/1992 | Phillips | 301/110.5 |
| 6,102,821 | A * | 8/2000 | Nakamura | 474/160 |
| RE38,094 | E * | 4/2003 | Buchalter | 70/233 |
| 7,562,943 | B2 * | 7/2009 | Kanehisa | 301/124.2 |
| 8,197,371 | B2 * | 6/2012 | D'Aluisio | 474/160 |
| 2004/0169418 | A1 * | 9/2004 | Kanehisa et al. | 301/124.2 |

* cited by examiner

*Primary Examiner* — Jason Bellinger
*Assistant Examiner* — Jean Charleston (57) ABSTRACT

The present invention teaches a novel axle apparatus for a driven bicycle hub that when used in conjunction with contemporary hubs eliminates the need for a user to become involved in any way with the cogset or chain. The axle of the apparatus is comprised of three main sub-assemblies: a non-driven side lever and shaft, a non-driven side hub insert and a driven side freewheel insert. The design of the present invention is such that it may be adapted for use with most of the contemporary hubs/freewheels available. The three sub-assemblies act in concert to form a solid axle in a two stage action. The mating action is such that misalignment of the wheel is impossible.

9 Claims, 6 Drawing Sheets

SOLID FORMING QUICK RELEASE BICYCLE AXEL

This is non-provisional application for patent claims priority benefit of provisional application for patent 61/281,580 filed Nov. 18, 2009.

BRIEF DESCRIPTION

The subject of this invention relates to the bicycle industry. More specifically, the disclosed invention teaches a novel self-aligning axle for use with a driven bicycle hub. The novelty lies in the ability to remove the hub without disturbing the cog cluster yet when in place, forms a solid axle that demonstrates the rigidity and strength of conventional axle apparatuses. The apparatus of the present invention enables a complete wheel change in less than five seconds.

BACKGROUND OF THE INVENTION

Chain driven bicycle drive trains have existed for many years. Generally the chain receives power input from a peddle crank that has a motive force exerted upon it from a rider's legs. The force is transferred by the chain to the driven wheel by one of a plurality of geared cogs, for example, which is in turn mechanically linked to a hub. The hub is attached to the drive wheel by means of spokes or solid inserts such as in the so-called disk wheels. In this way linear force from a rider's legs is transformed to rotational force applied to the wheel and then to the road surface.

From time to time the wheel must be detached from the bicycle frame, for example, to change a flat tire or to replace a worn part. There exist many contemporary methods for attaching the wheel to the bicycle frame. One method uses a solid axle threaded on both ends. Once the axle ends have been located correctly in the frame lugs, a pair of nuts are tightened to fix the wheel in place. A second method uses a hollow axle through which a rod, or so called skewer, is run. One end of the skewer has a lever and the other end an adjustable nut. Once the wheel is in the correct position the lever is operated which results in a clamping force to fix the wheel in place.

While these methods are functional, they suffer from a common flaw. The chain must be disengaged from the drive cogs in order to remove the wheel. Depending on the complexity of the cogset, this can be a messy and time consuming operation. For example, consider a ten speed cogset typical of contemporary road or mountain bicycles. In order to remove the wheel the chain must be driven to the smallest cog in order to provide the requisite slack chain tension to allow the wheel to drop away from the frame. Once done, the derailleur mechanism, which is used to move the chain up and down the cogset, must be held out of the way so that the cogset, which is attached permanently to the wheel, will have the needed clearance to drop away from the frame lugs.

Once the wheel is clear, maintenance can occur. But the same problems exist upon remounting of the wheel. First the derailleur must be moved out of the way, then the chain must be manually placed on the correct cog, then the wheel carefully moved into the frame lugs and the securing mechanism engaged. One major problem with prior art methods is that it is difficult to ensure the proper alignment of the wheel in the frame lugs. This happens in part because the chain exerts an off-axis load on the cogset which tends to make the wheel align off center. The result is that the wheel may then interfere with the brake mechanism causing an unwanted drag.

A second major problem with prior art methods is that the derailleur is very delicate. If the user inadvertently applies a force in the wrong place, the alignment of the derailleur box could be affected. This is so because the derailleur is essentially a parallelogram that moves the chain left or right depending on the rider's selection of gear. Any misalignment will cause difficulty in shifting. Finally, since the chain is now on the smallest cog, the shifter mechanism must once again be operated to place the chain on a cog that will allow a rider to easily get moving.

What would be desirable is an axle apparatus that forms essentially a solid axle when in place, but that eliminates the need for the user to deal with the chain or cogset when the wheel must be removed from the frame. The apparatus of the present invention provides an improved axle that accomplishes this goal yet still permits wheel mounting/dismounting without the need to manipulate the cog cluster and associated drive train components.

SUMMARY OF THE INVENTION

The present invention teaches a novel axle apparatus for a driven bicycle hub that when used in conjunction with contemporary hubs eliminates the need for a user to become involved in any way with the cogset or chain. The axle of the apparatus is comprised of three main sub-assemblies: a non-driven side lever and shaft, a non-driven side hub insert and a driven side freewheel insert. The design of the present invention is such that it may be adapted for use with most of the contemporary hubs/freewheels available. The three sub-assemblies act in concert to form a solid axle in a two stage action. The mating action is such that misalignment of the wheel is impossible.

The non-driven side insert is comprised of a first hollow shouldered barrel, a coil spring, a male spline sub-assembly and a retaining pin. The non-driven side insert is force fit on the inside surface of the hub via a non-driven side bearing and the male spline sub-assembly. Once in place, the first hollow shouldered barrel is fixed in place such that an outer male spline cap is free to rotate about the body of the male spline sub-assembly. The non-driven side lever and shaft passes through the first hollow shouldered barrel such that when the lever is operated the male spline sub-assembly engages with a mating female spline insert contained within the freewheel body and the threaded end of the shaft locks the sub-assemblies together forming a solid axle.

The driven side freewheel insert is comprised of a second shouldered barrel and a female spline insert. The second shouldered barrel is force fit on the inside of a freewheel body via a pair of bearings. The female spline insert is then force fit into the opposite end of the freewheel body in such a way as to allow the body of the freewheel to which a cogset, and thus the chain, are mounted, to rotate freely. The outside end of the second shouldered barrel is threaded and is permanently attached to the driven side frame lug by use of a conventional nut and washer. In this way the chain, cogset and derailleur may remain in situ when the hub body is removed. As discussed below, a set of self aligning tabs allow the hub to be mounted precisely without interfering with the driven side freewheel insert In operation, the user turns the lever counter-clockwise a few revolutions to loosen the shaft from the threads of the driven side female spline insert, then opens the lever to disengage the male spline from the female spline. At this point the wheel may be removed from the bicycle. Since the cogset and chain are still mounted in place on the driven side second shouldered barrel, the user need not become involved with either in order to remove the wheel. This eliminates the possibility of misalignment or damage to drive train components and provides an increased measure of safety for the user since there is no possibility of being pinched by the chain or stabbed by a tooth of a cog.

To mount the wheel the opposite process is used. Since the male spline sub-assembly and the female spline insert have complementary alignment patterns, or alignment tabs, on their mating surfaces, the user can very easily mount the wheel with perfect alignment in a very short time, then operate the lever to engage the splines and turn the lever two revolutions clockwise to lock the mechanism in place. At this point in time a solid axle has been formed and is perfectly aligned with the cogset without the need to manipulate the chain or derailleur in any way.

As can be seen, a major advantage of the apparatus of the present invention is that the alignment of the cogset, chain and derailleur does not change during the wheel dismounting/remounting procedure, thus it is impossible to cause damage to the delicate derailleur when dismounting or remounting the driven wheel. Moreover, due to the novel design of the lever/shaft mechanism, the dismounting/remounting procedure is very rapid. As well as the advantages discussed above, other advantages of the present invention are discussed below in conjunction with the drawings and figures attached.

DETAILED DESCRIPTION OF PREFERRED EMBODIMENTS

As described briefly above, the apparatus of the present invention provides substantial improvements in the way a driven bicycle wheel is mounted to a bicycle frame. These improvements are garnered through a novel axle design that uses a sliding spline mechanism to form a solid axle while at the same time allowing very rapid dismounting and remounting of the wheel.

Figure 1:
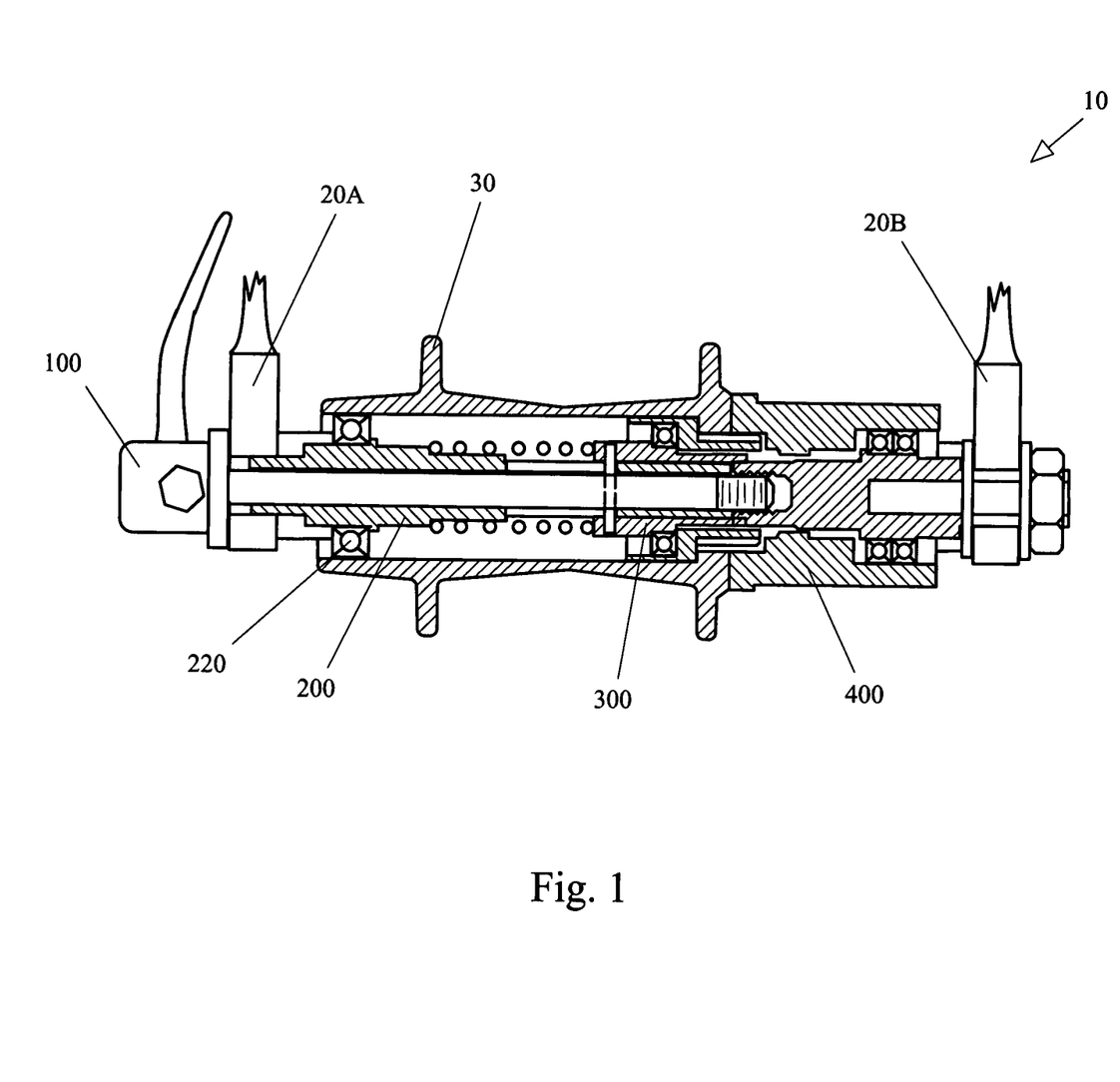
FIG. 1: is an overall sectional view of the apparatus of the present invention.

FIG. 1 shows a cross sectional view 10 of the apparatus of the present invention mounted to a typical wheel hub 30 and freewheel sub-assembly 400. The apparatus of the present invention is comprised of a lever and shaft sub-assembly 100, a first shouldered barrel sub-assembly 200, a male spline sub-assembly 300 and a freewheel sub-assembly 400. Note that the hub 30 and the freewheel sub-assembly 400 are commercially available parts provided by such manufacturers as Shimano (Shimano North America, Irvine, Calif.) and Spinergy, (Spinergy, Inc. Carlsbad, Calif.).

Looking still at FIG. 1, the first shouldered barrel sub-assembly 200 is force fit into the non-driven end of the hub 30 via bearing 220. First shouldered barrel sub-assembly 200 provides a surface over which male spline sub-assembly 300 can slide under the influence of lever and shaft sub-assembly 100. In turn, male spline sub-assembly 300 engages with a female spline insert which is part of freewheel sub-assembly 400. Lever and shaft sub-assembly 100 has a threaded end which is used to lock the various sub-assemblies together forming a solid axle around which hub 300 rotates. The entire assembly mates with the chain stay lugs 20A and 20B of a bicycle frame.

Figure 2:
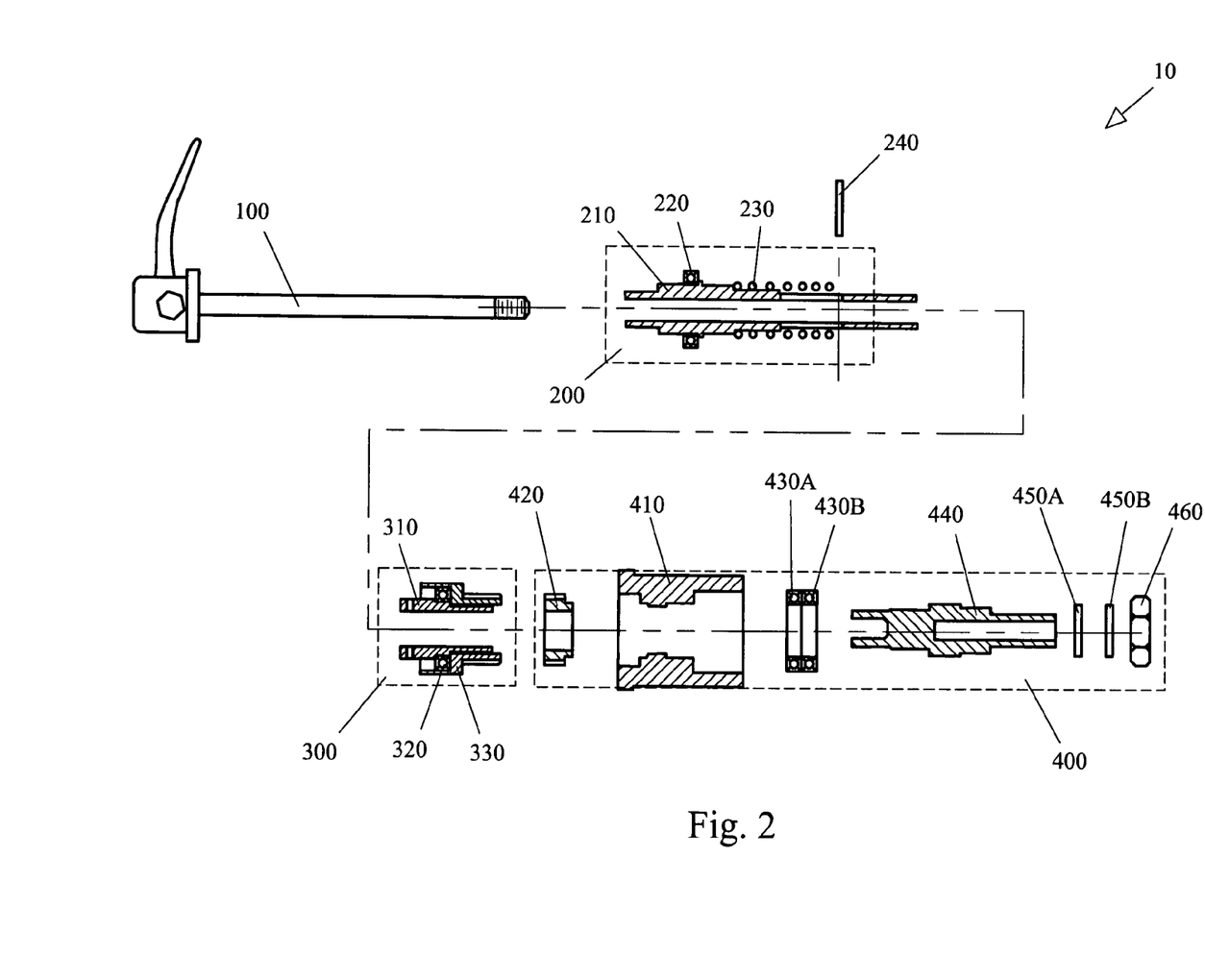
FIG. 2: is an exploded sectional view of the assembly of the apparatus of the present invention.

Turning now to FIG. 2, the apparatus of the present invention 10 is shown in an exploded view to detail the assembly and function of the three sub-assemblies. Beginning with the lever and shaft 100, as can be seen on one end is a lever very similar to a common skewer lever used extensively in the bicycle industry. The lever rotates about an axis that has a cam internally (not shown, but well understood by those of skill in the art) such that the shaft moves horizontally under the influence of the cam. The shaft has a thread at the opposite end that mates with the thread located on the interior surface of the second shouldered barrel 440. The function of the lever and shaft sub-assembly is to apply a horizontal force which forms a solid axle by clamping the sub-assemblies together. In a preferred embodiment, shaft 100 is made from tempered steel, but as will be recognized by those of skill in the art, other materials, for example, titanium, could be used without departing from the spirit of the invention.

A first shouldered barrel sub-assembly 200 fits about the shaft with sufficient clearance to allow free rotation of the hub [30 of FIG. 1]. First shouldered barrel sub-assembly 200 is comprised of a first shouldered barrel 210, bearing 220, spring 230 and pin 240. Bearing 220 is force fit into the non-driven side of the hub in the conventional way. Spring 230 is used to provide a compression force on the male spine sub-assembly 300 when the lever and shaft sub-assembly is operated. Pin 240 is used to fix the male spline sub-assembly 300 to the first shouldered barrel 210 such that when the lever is operated the male spline sub-assembly 300 compresses the spring 230. The travel of the male spline sub-assembly 300 is sufficient to allow the spline teeth to clear the freewheel sub-assembly 400, thereby allowing dismounting of the wheel.

In a preferred embodiment, the first shouldered barrel 210 is made from aluminum, however, those of skill in the art will understand that other materials, for example, titanium, could be used without exceeding the ambit of the claims. Bearing 220 and spring 230 are standard commercial parts readily available in the industry, thus are not critical to the operation of the invention. Pin 240 is made from hardened steel.

Male spline sub-assembly 300 is comprised of spline body 310, bearing 320 and spline teeth 330. Spline body 310 has an inner surface circumference that provides a close fit over the outer surface of first shouldered barrel 210. While not a force fit, the tolerance is such that there is very little play between the parts. Bearing 320 is force fit about the outer circumference of spline body 310. Spline teeth 330 is then force fit on the outer surface of bearing 320. There is sufficient clearance between the inner surface of spine teeth 330 and spline body 310 to allow spline teeth 330 to freely rotate about spline body 310. This is necessary to allow the wheel to rotate when spline teeth 330 is engaged with the freewheel sub-assembly 400.

In a first embodiment, the teeth on spline teeth 330 are of the conventional flat gear tooth type. The mating ends of the teeth are slightly tapered to assist in engaging the male teeth with the female teeth located in the female spline insert 420. In a second, improved embodiment, the teeth are of a novel tapered pin design. These tapered pins are configured such that they will engage the female insert 420 regardless of wheel hub-to-freewheel position. This second embodiment provides very rapid remounting capability which is especially important when making a wheel change in a competitive setting.

In a preferred embodiment, spline body 310 is made from aluminum, however, those of skill in the art will understand that other materials, for example, titanium, could be used without exceeding the ambit of the claims. Bearing 320 is a standard commercial part readily available in the industry, thus is not critical to the operation of the invention. Also in the preferred embodiment, the tapered pins are made of hardened steel. In the alternative embodiment, spline teeth 330 is made from hardened steel. In both cases the number of teeth or pins is ten.

Freewheel sub-assembly 400 is comprised of female spline insert 420, freewheel body 410, second shouldered barrel 440, bearings 430A and 430B, star washers 450A and 450B and retaining nut 460. Freewheel body 410 is of the conventional variety supplied by numerous manufacturers, for example, Shimano (Shimano North America, Irvine, Calif.), Campagnolo S.r.l., Vincenza, Italy, or SRAM LLC, Chicago, Ill. As such this component is not discussed in detail except to note that, due to slight differences in mechanical configuration, each freewheel body must be modified to accept the other parts of the invention. The modifications required involve machining processes well know in the art, thus are not discussed in detail to aid in clarity.

The outer surface of bearings 430A and 430B are press fit into freewheel body 410. Two bearings are used instead of the normal single bearing in order to provide the necessary alignment stability when the wheel has been dismounted. Recall that one of the advantages of the present invention is that the cog cluster, chain and derailleur remain in situ even when the wheel is dismounted. To accommodate the tortional strain placed on the cog cluster from the chain tension, a second bearing is used. Bearings 430A and 430B are standard commercial parts and as such are critical to the invention, however, a lack of detailed description of these bearings should not be read as a limitation on the invention.

Second shouldered barrel 440 is press fit into the inner surface of bearings 430A and 430B. In this way freewheel body 410 freely rotates about second shouldered barrel 440. Female spline insert 420 is then press fit form the opposite end such that when assembled, female spline insert 420, freewheel body 410, bearings 430A and 430B and second shouldered barrel 440 form a single component that is fixed to the driven side chainstay [20B of FIG. 1] lug of a bicycle frame via star washers 450A and 450B and retaining nut 460. When the wheel is dismounted, the combination of the two star washers 450A and 450B and the retaining nut 460 provide the requisite positional stability to ensure that proper alignment between the wheel hub [30 of FIG. 1] and freewheel sub-assembly is maintained.

In a preferred embodiment, second shouldered barrel 440 is made from aluminum, however, those of skill in the art will understand that other materials, for example, titanium, could be used without exceeding the ambit of the claims. Female spline insert 420 in the second, alternative embodiment is made of hardened steel and is press fit into freewheel body 410. In the preferred embodiment, the holes that receive the hardened steel pins are machined into freewheel body 410. In both cases the number of teeth or pins is ten. Nut 460 and star washers 450A and 450B are standard commercial parts and are thus not discussed in detail. Those of skill in the art will recognize that any suitably sized combination of nut and washers will perform in the intended inventive manner.

To provide the necessary longitudinal force, or compression force, to form a solid axle, the non-driven inside surface of second shouldered barrel 440 has a thread that mates with the thread on the driven side end of lever and shaft sub-assembly 100. As discussed in detail below, when the lever is operated to engage the male spline sub-assembly 300 with female spline insert 420, the threads on the lever and shaft sub-assembly 100 are placed in close proximity to the threads on the inner surface of second shouldered barrel 440, such that a few clockwise turns of the lever and shaft sub-assembly 100 applies the compression force needed to lock the sub-assemblies into a solid axle. Unlike conventional skewers, once the threads of the lever and shaft sub-assembly 100 mate with the internal threads on the inner surface of second shouldered barrel 440, the requisite clamping force has been exerted as explained just below in detail in conjunction with FIG. 3.

Figure 3A:
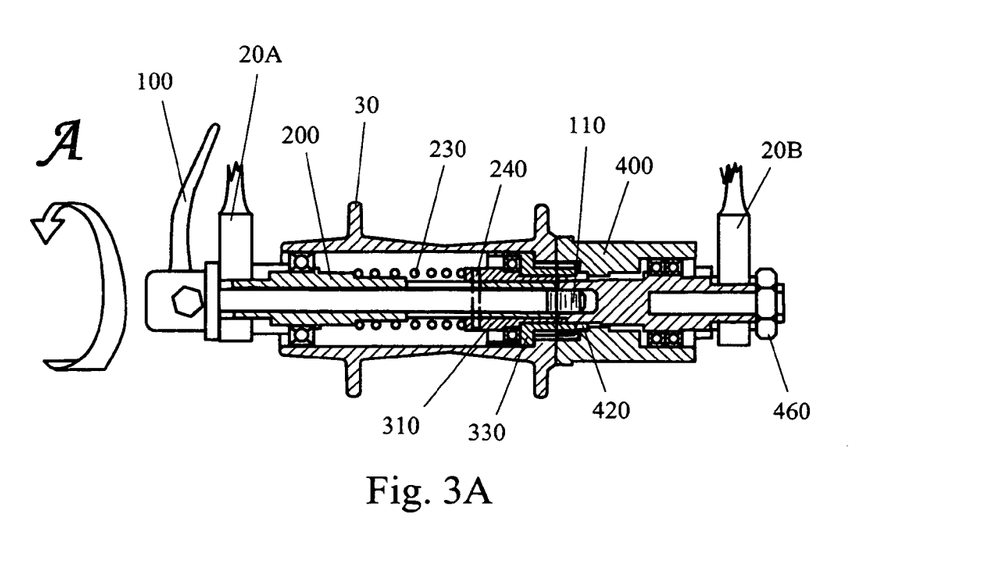
FIG. 3A: is a sectional view of the apparatus of the present invention in the locked mode.

FIG. 3 presents a discussion of how the apparatus of the present invention functions. Beginning with FIG. 3A a sectional view of the apparatus is shown with the wheel mounted. Note that while the details of the wheel are not shown, it t will be recognized by those of skill in the art that a detailed discussion of the wheel is not necessary for an understanding of the invention; however, the lack of such a detailed discussion should not be read as a limitation on the scope of the invention. For purposes of this discussion, it will be assumed that a conventional bicycle wheel is mounted on the hub 30 and that it is operating properly.

FIG. 3A presents the four main sub-assemblies including the lever and shaft sub-assembly 100, the first shouldered barrel sub-assembly 200, the male spline sub-assembly [300 of FIG. 1] and the freewheel sub-assembly 400 in the locked configuration. The threads 110 of the shaft have been tightened into the female spline insert 420 providing the compression force required to lock the sub-assemblies together. The spring 230 is in the relaxed mode. The pin 240 that slides in a groove in the axle has caused the spline body 310 and spline teeth 330 to mate with the female spline insert 420. The freewheel sub-assembly is fixed to the driven side chainstay lug 20B by nut 460. In this configuration, the hub 30 and the freewheel sub-assembly are locked together and the wheel rotates properly in the same manner as if there were a solid axle running between non-driven side chainstay lug 20A and driven side chainstay lug 20B.

Supposing now that a user wishes to dismount the wheel. The lever is turned two turns counter-clockwise, as shown by arrow A, releasing the compression force holding the sub-assemblies together. Only two turns are required due to the coarse nature of the thread 110. As discussed in detail below in conjunction with FIGS. 5 and 6, the mechanical features of the present invention provide for self alignment and, when combined with the compression force generated by the locking mechanism, allow for a coarse thread. Once the two counter-clockwise turns have been completed, the threads of the driven end of the lever and shaft sub-assembly 100 have completely disengaged from the mating threads on the inner surface of the female spline insert 420.

Figure 3B:
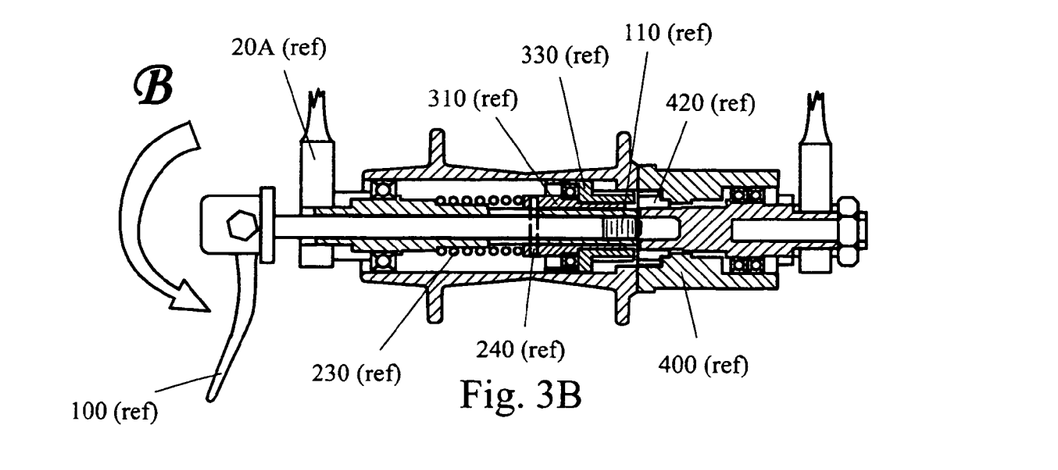
FIG. 3B: is a sectional view of the apparatus of the present invention in the unlocked mode.

Looking at FIG. 3B, at the point in the process where the threads of the driven end of the lever and shaft sub-assembly 100 have completely disengaged from the mating threads on the inner surface of the female spline insert 420 the compression force holding the plurality of sub-assemblies together has been released. The user now operates the lever as shown by arrow B. This action causes the spring 230 to compress and, due to pin 240, causes the male spline sub-assembly to retract, disengaging the teeth 330 from the female spline insert 420. The wheel is now free to drop away from non-driven side chainstay lug 20A and, recalling that nut 460 fixes the freewheel sub-assembly 400 to the driven side chainstay 20B, leaves the cogset, chain and derailleur untouched. Thus one significant improvement manifested by the present invention is the ability to dismount and remount a wheel without disturbing the cogset, chain or derailleur in any way.

Remounting of the wheel is the opposite of the dismounting procedure, thus is not discussed in detail. It is noted that the lack of this discussion should not be read as a limitation on the scope of the inventions since such a process is well understood by those of skill in the art.

Figure 4:
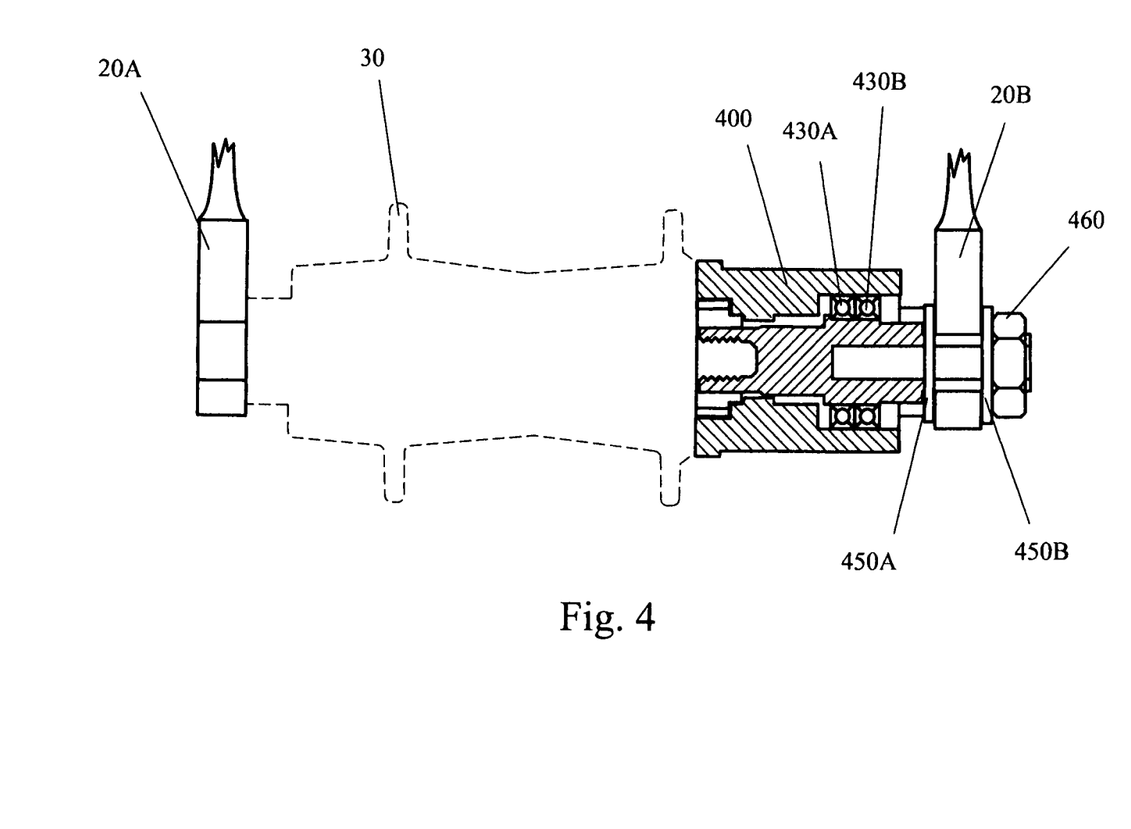
FIG. 4: provides the details of the freewheel attachment of the apparatus of the present invention with the wheel dismounted.

FIG. 4 shows the appearance of the apparatus after the wheel has been dismounted. Freewheel sub-assembly 400 rotates about bearings 430A and 430B. It will be understood from the explanation above that the chain and derailleur maintain alignment due to the presence of these bearings working in concert with nut 460 and star washers 450A and 450B. Hub 30 and chainstays 20A and 20B are provided for reference.

Figure 5:
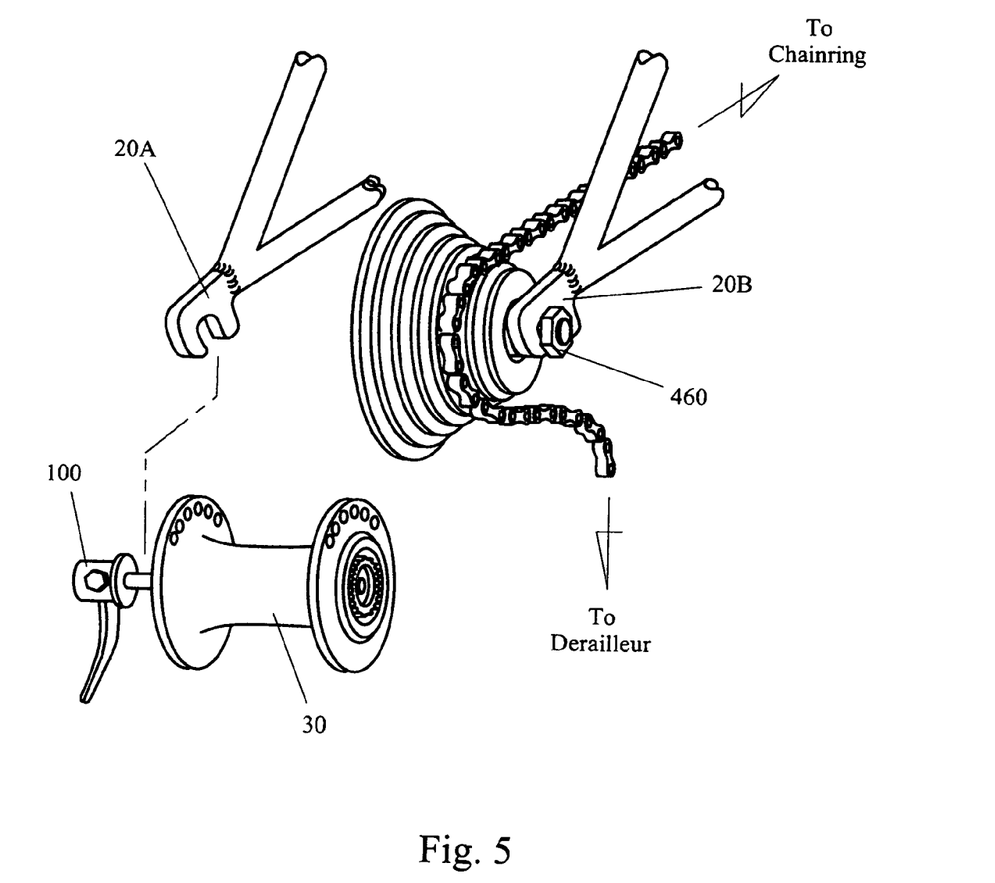
FIG. 5: provides an overview of the wheel hub and cogset relationship of the apparatus of the present invention in the dismounted position.

FIG. 5 provides an isometric view of the apparatus in the dismounted state. Hub 30 contains the sub-assemblies operated by lever and shaft sub-assembly 100. As can be seen, nut 460 fixes the cogset, chain and derailleur (not shown) in correct alignment while the hub 30 is removed. Chainstays 20A and 20B are again provided for reference.

Figure 6:
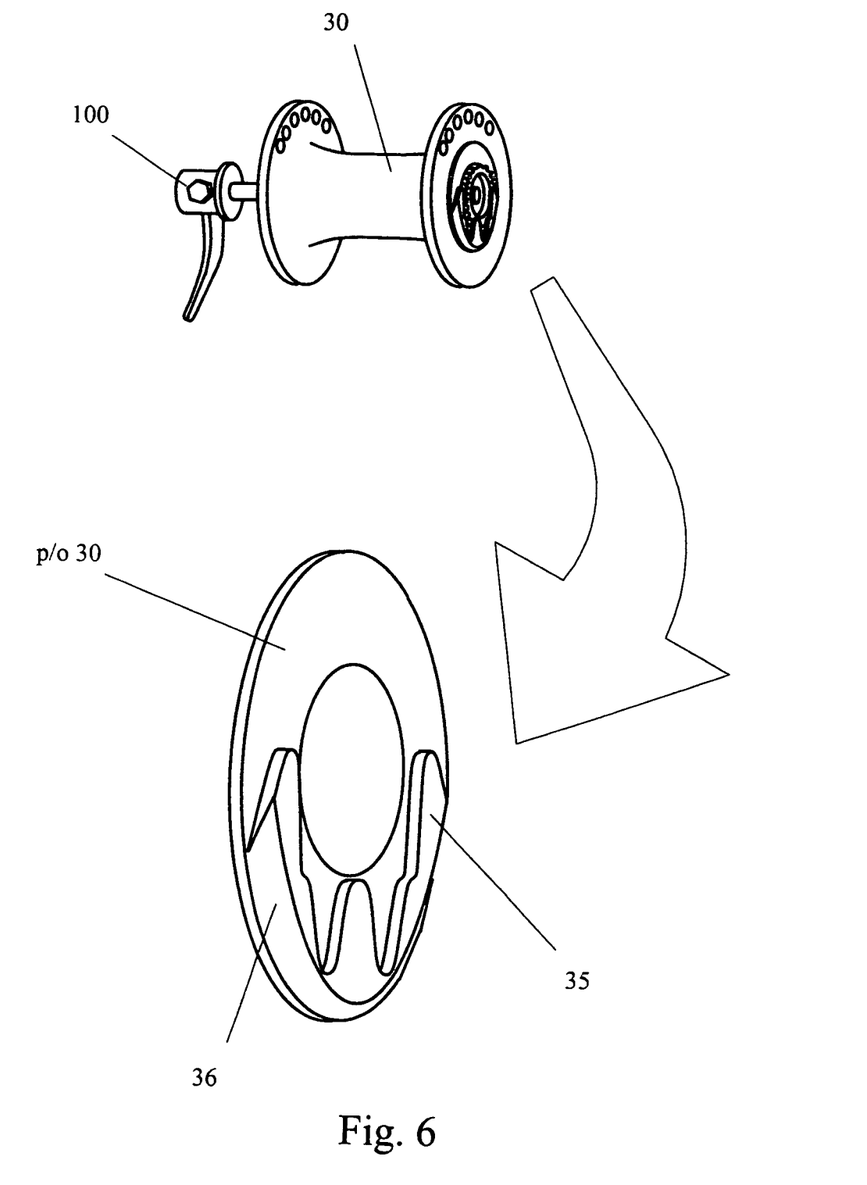
FIG. 6: provides the detail of the pattern of the self-aligning tabs of the apparatus of the present invention.

FIG. 6 provides the details of the self aligning features of the apparatus. The hub 30 and lever and shaft sub-assembly 100 are shown to provide a reference. Recalling that the present invention has two instantiations, the separate alignment methods are discussed individually.

In the first instantiation of the present invention the driven side of the hub 30 has two features which together allow for self alignment during the remounting procedure: a beveled edge 36 and three alignment tabs 35. When hub 30 is placed in close proximity to the mating surface of the freewheel sub-assembly [400 of FIG. 3A], the beveled edge 36 tends to guide the three alignment tabs 35 toward an exact opposite feature on the freewheel sub-assembly. Since the alignment tabs 35 have rounded ends, a simple turn of the wheel causes these tabs to seat. Since the alignment tabs 35 form a pair of "V"s at the bottom, the two surfaces, i.e. the driven side surface of the hub 30 and the mating surface of the freewheel sub-assembly, are pulled into correct alignment. At this point the lever and shaft sub-assembly may be operated to move the male spline teeth [330 of FIG. 3A] into the female spline insert [420 of FIG. 3*a*].

In the second, preferred embodiment, an improved self aligning configuration is used that eliminates the need to rotate the wheel in order to engage the alignment tabs. In the preferred embodiment, the male spline teeth and the mating female spline insert are removed and instead a set of tapered pins and mating holes are used. The taper on the end of the pins and the entry bevel on the mating holes are such that no matter what position the wheel is in, the pins will necessarily engage the holes. The pin and hole combination is dimensioned in such a way that when the lever and shaft sub-assembly is operated, the hub and freewheel are brought into correct alignment prior to turning the shaft clockwise two turns to lock the sub-assemblies together. It must be noted that while the alignment tabs are not required for the preferred embodiment, neither do they interfere, thus the presence or absence of these alignment tabs has no effect on self alignment in the preferred embodiment.

One advantage of the present invention is that a wheel can be dismounted and remounted without manipulating the cogset, chain and/or derailleur in any way. This eliminates the possibility of causing damage or misalignment of these critical components during the wheel change. Moreover, since the chain does not need to be removed from the cogset, the user's hands and clothing do not become soiled from the grease normally attendant on the moving parts of a bicycle drive train.

A second advantage of the present invention is rapidity with which a wheel may be changed. While not important to the average user, competitive cyclists need to have a wheel change done in very short elapsed times in order to stay in contact with the other riders in the event. The apparatus of the present invention allows a dismount and remount cycle of less than five seconds, cutting contemporary times in half.

A third advantage of the present invention is ease of cogset maintenance. Typically, the wheel is removed and the cogset cleaned on a bench or table. The present invention allows the user to remove the wheel and leave the cogset in place for cleaning. Thus unlike other wheel mounting methods, the method of the present invention allows complete access to the chain, derailleur, cogset and hub mechanism for inspection, lubrication, and any maintenance that may be required.

A fourth advantage of the present invention is safety. With conventional mounting methods, since the chain must be removed from the cogs the user must necessarily come in contact with both chain and cogs. The result is a potential for injury due to pinching or stabbing from chain and cogs. The present invention eliminates this potential since the chain, cogs and derailleur never need be touched by the user.

A fifth advantage of the present invention is that no possible misalignment can occur. Conventional methods suffer from an off-axis force exerted by the chain upon the cogset making perfect alignment difficult. The present invention aligns precisely each time the wheel is replaced due to the self aligning tabs. Since the cogset and chain were never removed their position relative to the hub is not altered. Once the clamping mechanism is activated the wheel is in the proper position and is ready for use.

What is claimed is:

1. A self aligning driven bicycle axle apparatus, comprising:
    a lever and shaft sub-assembly, said lever and shaft sub-assembly further comprised of;
        a lever connected to a cam, said cam capable of providing lateral motion;
        a shaft connected to said cam on a first end and having a male thread on the opposite end;
    a first shouldered barrel sub-assembly, said first shouldered barrel sub-assembly further comprised of;
        a shouldered barrel, said shouldered barrel having an inner bore capable of passing said shaft;
        a bearing fixably attached to a first shoulder on the outer surface of said of said shouldered barrel;
        a spring fitting about a second shoulder on said outer surface of said shouldered barrel, and;
        a pin passing through said shouldered barrel and said shaft so as to capture said spring;
    a male spline sub-assembly, said male spline sub-assembly further comprised of;
        a spline body;
        a bearing fixably located about the outer surface of said spline body, and;
        a set of male spline teeth such that the inner circumference of said spline body slides over said first shouldered barrel sub-assembly, and;
    a freewheel sub-assembly, said freewheel sub-assembly further comprised of;

a freewheel body, said freewheel body having an inner circumference capable of passing a second shouldered barrel;
a pair of bearings fixably attached to the inner surface of said freewheel body;
a set of female spline teeth sized to mate with said male spline teeth, said female spline teeth fixably attached to the inner surface of said freewheel body;
a second shouldered barrel;
a pair of star washers, and
a nut such that when said lever and shaft sub-assembly, said first shouldered barrel sub-assembly, said male spline sub-assembly and said freewheel sub-assembly are concentrically located within the inner circumference of a bicycle hub a lateral compression force is exerted which creates a solid axle.

2. The freewheel sub-assembly of claim 1 where the set of male spline teeth and female spline teeth each have ten teeth.

3. The lever and shaft sub-assembly of claim 1 wherein the shaft is made from tempered steel.

4. The first shouldered barrel, the second shouldered barrel and the spline body of claim 1 wherein each is made from aluminum.

5. A self aligning driven bicycle axle apparatus, comprising:
a lever and shaft sub-assembly, said lever and shaft sub-assembly further comprised of;
a lever connected to a cam, said cam capable of providing lateral motion;
a shaft connected to said cam on a first end and having a male thread on the opposite end;
a first shouldered barrel sub-assembly, said first shouldered barrel sub-assembly further comprised of;
a shouldered barrel, said shouldered barrel having an inner bore capable of passing said shaft;
a bearing fixably attached to a first shoulder on the outer surface of said of said shouldered barrel;
a spring fitting about a second shoulder on said outer surface of said shouldered barrel, and;
a pin passing through said shouldered barrel and said shaft so as to capture said spring;
a male spline sub-assembly, said male spline sub-assembly further comprised of;
a spline body;
a bearing fixably located about the outer surface of said spline body, and;
a set of male pins, said male pins having tapered ends, such that the inner circumference of said spline body slides over said first shouldered barrel sub-assembly, and;
a freewheel sub-assembly, said freewheel sub-assembly further comprised of;
a freewheel body, said freewheel body having an inner circumference capable of passing a second shouldered barrel;
pair of bearings fixably attached to the inner surface of said freewheel body;
a set of female holes sized to mate with said male pins, said female holes formed within the inner surface of said freewheel body;
a second shouldered barrel;
a pair of star washers, and
a nut such that when said lever and shaft sub-assembly, said first shouldered barrel sub-assembly, said male spline sub-assembly and said freewheel sub-assembly are concentrically located within the inner circumference of a bicycle hub a lateral compression force is exerted which creates a solid axle.

6. The freewheel sub-assembly of claim 5 where the set of male pins and female holes each have ten pins and holes.

7. The set of male pins in claim 5 wherein the pins are made from hardened steel.

8. The lever and shaft sub-assembly of claim 5 wherein the shaft is made from tempered steel.

9. The first shouldered barrel, the second shouldered barrel and the spline body of claim 5 wherein each is made from aluminum.

\* \* \* \* \*